(12) United States Patent
Miyazaki et al.

(10) Patent No.: US 7,993,555 B2
(45) Date of Patent: Aug. 9, 2011

(54) STRUCTURE OF MOLDING TOOLS, INJECTION MOLDING DEVICE, AND MOLDING METHOD

(75) Inventors: Takemi Miyazaki, Hamura (JP); Shigeru Hosoe, Hachioji (JP); Yuiti Fujii, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/671,313

(22) PCT Filed: Jul. 22, 2008

(86) PCT No.: PCT/JP2008/063110
§ 371 (c)(1),
(2), (4) Date: Jan. 29, 2010

(87) PCT Pub. No.: WO2009/016990
PCT Pub. Date: Feb. 5, 2009

(65) Prior Publication Data
US 2010/0193983 A1    Aug. 5, 2010

(30) Foreign Application Priority Data
Aug. 1, 2007 (JP) ................................ 2007-201370

(51) Int. Cl.
*B29C 45/26* (2006.01)
*B29C 45/63* (2006.01)
(52) U.S. Cl. ..................... 264/102; 264/328.7; 264/334; 425/546
(58) Field of Classification Search ............... 264/39, 264/101, 102, 328.7, 334; 425/546, DIG. 47, 425/542
See application file for complete search history.

(56) References Cited

U.S. PATENT DOCUMENTS

| | | | | |
|---|---|---|---|---|
| 3,579,799 A | * | 5/1971 | Furstenburg et al. | 29/416 |
| 3,665,069 A | * | 5/1972 | Richmond | 264/219 |
| 4,540,534 A | * | 9/1985 | Grendol | 264/2.2 |
| 4,797,236 A | * | 1/1989 | Kojima | 264/40.1 |
| 4,810,444 A | * | 3/1989 | Alberino et al. | 264/102 |
| 5,370,521 A | * | 12/1994 | McDougall | 425/405.1 |
| 6,139,307 A | * | 10/2000 | Plourde et al. | 425/192 R |
| 6,299,819 B1 | * | 10/2001 | Han | 264/510 |

FOREIGN PATENT DOCUMENTS

| | | |
|---|---|---|
| JP | 59-148634 | 8/1984 |
| JP | 7-68610 | 3/1995 |
| JP | 2003-094459 | 4/2003 |

* cited by examiner

*Primary Examiner* — Jill L Heitbrink
(74) *Attorney, Agent, or Firm* — Cohen Pontani Lieberman & Pavane LLP

(57) ABSTRACT

Provided are a structure of molding tools and an injection molding device that can easily perform molding of an optical element even from a resin of low velocity or the like and can suppress any negative effects by air. The structure of the molding tools includes between the molding tools (61, 62) a fixed molding tool (61) and a movable molding tool (62) and an O-ring (63a) for keeping air tightness and a resin seal (63b) for preventing any resin leakage. The O-ring (63a) performs decreasing of the pressure in a cavity (CV) formed by joining the molding tools (61, 62), whereby the vacuum molding in which resin supply and resin curing is carried out under a decreased pressure can be performed. Accordingly, the effects such as prevention of air bubbling due to air trapping by injected resin within the cavity (CV) can be attained. Furthermore, the resin seal (63b) can prevent any resin leakage from the molding tools (61, 62) even when the resin having a low viscosity is used.

16 Claims, 6 Drawing Sheets

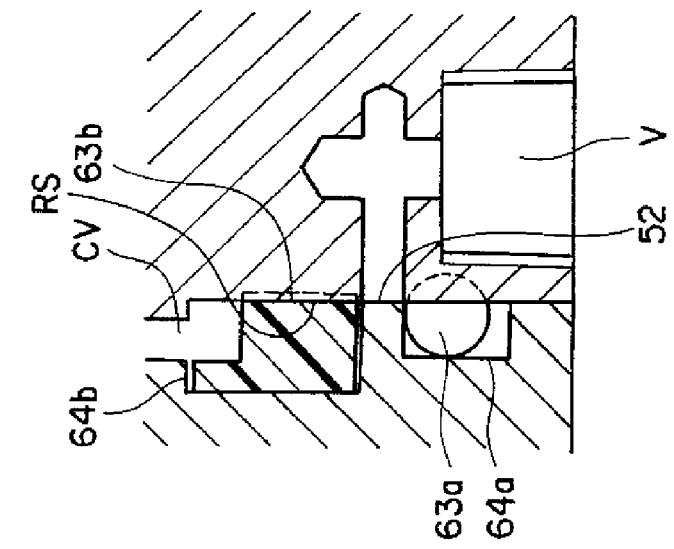
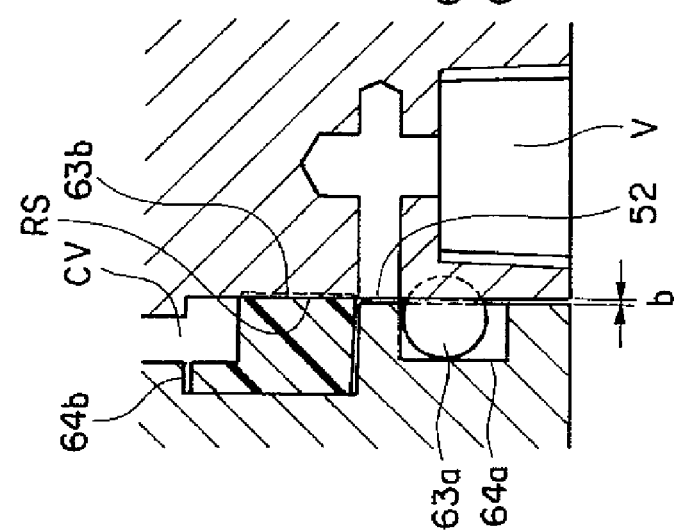
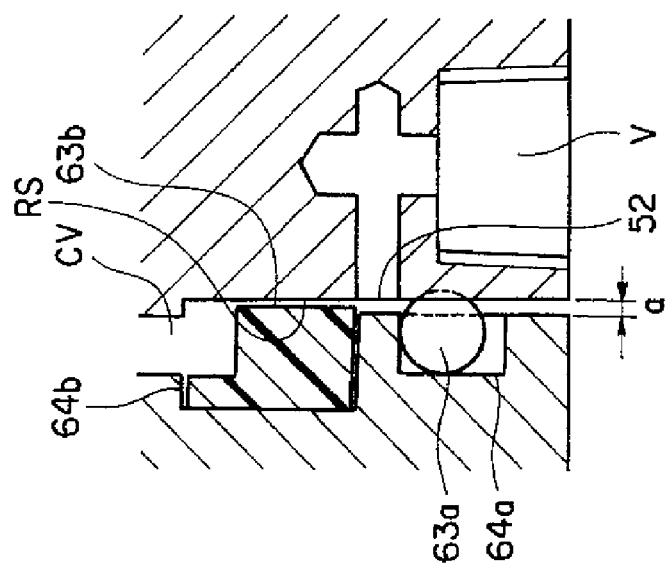

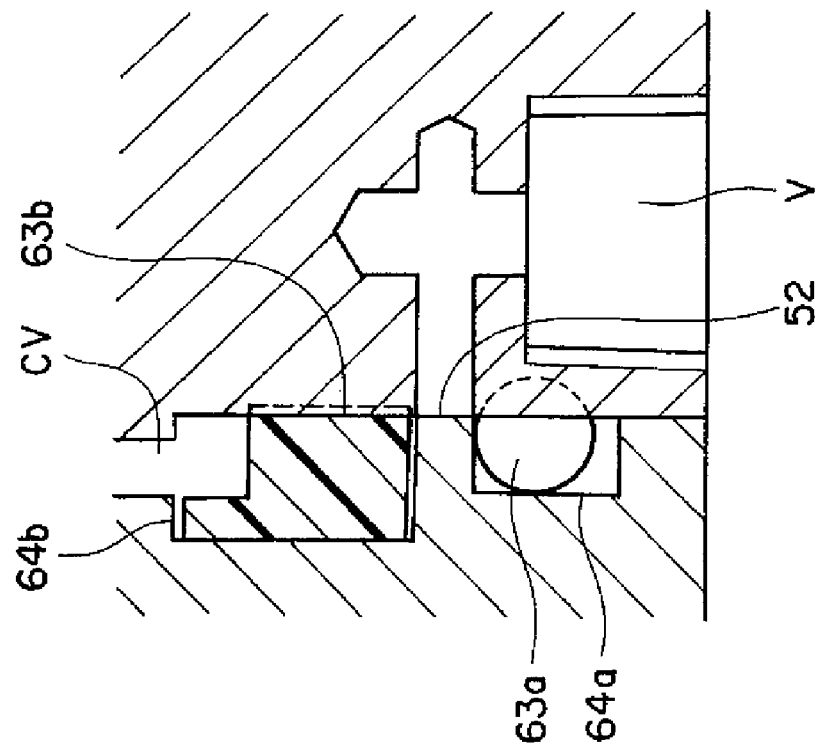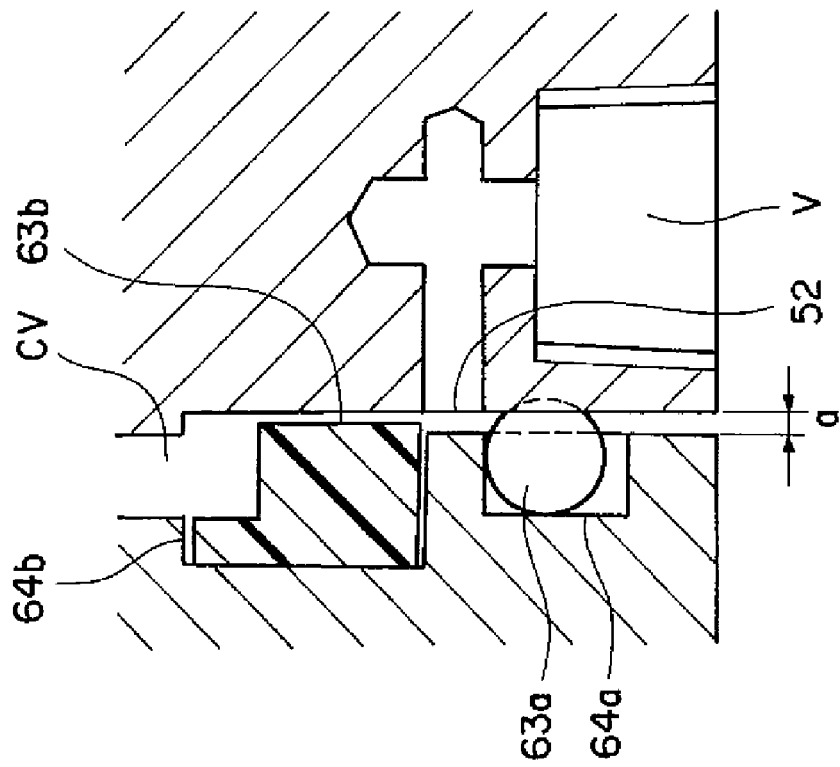

STRUCTURE OF MOLDING TOOLS, INJECTION MOLDING DEVICE, AND MOLDING METHOD

RELATED APPLICATIONS

This is a U.S. National Phase Application under 35 U.S.C. 371 of International Application PCT/JP2008/063110, filed on Jul. 22, 2008.

This application claims the priority of Japanese Application No. 2007-201370 filed on Aug. 1, 2007, the entire content of which is hereby incorporated by reference.

TECHNICAL FIELD

The present invention relates to a molding technology of an optical element, and in particular, to structures of molding tools, injection molding devices, and molding methods, for molding the optical element, using an energy curable resin.

BACKGROUND OF THE INVENTION

An injection molding device is disclosed (in Patent Document 1), in which a fixed molding tool and a movable molding tool are sandwiched between a fixed plate and a movable plate. This injection molding device includes a toggle mechanism for driving the movable plate, said toggle mechanism tightens the fixed plate and the movable plate, whereby the fixed molding tool and the movable molding tool are engaged to each other. When resins are injected by this device, a cavity formed by both tools allows air to be ejected through clearances between both tools.

Patent Document 1: Unexamined Japanese Patent Application Publication 7-68,610

DISCLOSURE OF THE INVENTION

Problems to be Solved by the Present Invention

Concerning the above described injection molding device, if a resin exhibiting low viscosity is injected during the injection operation, said resin tends to leak outside through the clearance between the molding tools, so that molding pressure cannot be increased. Further, if the molding is conducted in the air, air tends to be trapped in the resin, so that the resin is prevented from being hardened, or the resin is unevenly hardened, which are major problems.

Accordingly, an object of the present invention is to offer structures of molding tools and injection molding devices, being easily able to mold the optical element, even though the resin exhibiting low viscosity is used, whereby adverse influence caused by air can be suppressed.

Further, an object of the present invention is to offer the molding methods in which the above described structure of the molding tools and the injection molding device are used.

Means to Solve the Problems

The structure of the molding tools relating to the present invention is characterized in that a first molding tool and a second molding tool which is movable, are provided, wherein a first sealing member and a second sealing member are provided between the first molding tool and the second molding tool.

Based on a detailed embodiment of the present invention, the first sealing member is characterized to secure air tightness, and the second sealing member is characterized to prevent the resin from leaking.

By the above described structure of the molding tools, the pressure in the cavity, formed by the engaged first and second molding tools, is reduced by the first sealing member, so that vacuum molding can be conducted, while the resin is supplied under the decreased air pressure, and the resin is hardened under the decreased air pressure. Accordingly, air bubbles, which are to be produced when the air is trapped in the resin ejected into the cavity, are effectively controlled, further, the inhibition of hardening due to oxygen is also controlled, still further, an inner distortion of the injected product is also effectively reduced. By the second sealing member, even though the resin of the low viscosity is used, said resin is prevented from leaking outside through the engaged molding tools.

Based on a detailed embodiment of the present invention, the first sealing member is characterized to be arranged to be outer than the second sealing member from a position of a cavity, formed by the engaged first and second molding tools. In this case, the second sealing member, being arranged inside, can prevent the resin from leaking toward the first sealing member.

Based on another embodiment of the present invention, a vacuuming through-hole is further provided between the first sealing member and the second sealing member. In this case, since the vacuuming through-hole is provided on the first molding tool, a handling position of a pressure reducing device is easily secured. Further, since the vacuuming through-hole is provided between the first sealing member and the second sealing member, the resin is prevented from leaking outside through the through-hole.

Based on still another embodiment of the present invention, concerning the structure of the above described molding tools, the first sealing member and the second sealing member are characterized to be mounted on the second molding tool. In this case, when the resin of low viscosity is used, said resin is prevented from leaking toward a movable section of the molding tool, so that the movable section can move smoothly. That is, the resin does not leak toward a portion, sealed by the second sealing member, whereby a molded product can be easily taken out by the user.

Based on still another embodiment of the present invention, an ejector pin to eject the second sealing member, and an ejector device of the ejector pin are provided. In this case, since the second sealing member is ejected with the molded product, the molded product is effectively taken out.

Based on still another embodiment of the present invention, the first sealing member is characterized to be an O-ring. In this case, the sealing effect can be realized by a very simple structure.

Based on still another embodiment of the present invention, the second sealing member is characterized to be formed of resin. In this case, the air tightness can be increased in the cavity formed of the engaged first and second molding tools.

A first molding method relating to the present invention is characterized in that, being a molding method using the above detailed structure of the molding tools, vacuum drawing is conducted at a first mold clamping position where a first molding tool and a second molding tool are closed through a first sealing member, and an injection of a material and hardening are conducted at a second mold clamping position where the first molding tool and the second molding tool are positioned closer to each other than at the first mold clamping position.

Based on the above detailed molding method, since the first sealing member functions to reduce the air pressure in the cavity formed of the engaged first and the second molding tools, the vacuum molding operation can be effectively conducted. Due to this, the air bubbles, which are to be produced when the air is trapped in the resin ejected into the cavity, are effectively controlled, further, the inhibition of hardening due to oxygen is also controlled, still further, the inner distortion of the injected product is also effectively reduced. By the second sealing member, even though the resin of low viscosity is used, said resin is prevented from leaking outside through the engaged molding tools.

A second molding method relating to the present invention is characterized in that, being the molding method using the above detailed structure of the molding tools, vacuum drawing for the engaged molding tools is conducted at the first mold clamping position where the first molding tool and the second molding tool are closed through a first sealing member, and the injection of the material is conducted at the second mold clamping position where the first molding tool and the second molding tool are positioned closer to each other than at the first mold clamping position, subsequently, the injected material is hardened at a third mold clamping position where the first molding tool and the second molding tool are positioned closer to each other than at the second mold clamping position.

Based on the above method, compression molding is conducted after vacuum molding, whereby the deformation of the molded product, due to the compression and hardening, is prevented, bubbles, due to gas generated from the material, is prevented, and inner distortion of the molded product is prevented.

The injection molding device relating to the present invention is characterized to incorporate the above described structure of the molding tools.

Concerning the above described injection molding device, the structure of the molding tools is effective for the injection device which uses the resin exhibiting low viscosity. Accordingly, leakage of the resin and air trapping into the resin are effectively prevented, whereby the above described injection molding device can effectively and accurately produce the molded product.

BRIEF EXPLANATION OF THE DRAWINGS

FIGS. 3A, 3B and 3C show the boundary of the fixed molding tool and the movable molding tool, to detail an operation of the molding tools.

FIGS. 6A and 6B show another example of the operation of the molding tools shown in FIGS. 3A, 3B and 3C.

| EXPLANATIONS OF ALPHA-NUMERICAL SYMBOLS | |
|---|---|
| 10 | injection molding machine |
| 11 | fixed plate |
| 12 | movable plate |
| 13 | tool clamping plate |
| 15 | molding tool open-close clamping device |
| 20 | take-out device |
| 51 | temperature control device |
| 53 | pressure decreasing device |
| 16 | injection device |
| 16d | injection nozzle |
| 61 | fixed molding tool |
| 62 | movable molding tool |
| 63a | O-ring |
| 63b | resin seal |
| 100 | injection molding device |
| CV | cavity |
| GA | gate |
| V | valve |
| MP | molded product |

DETAILED DESCRIPTION OF THE PREFERRED EMBODIMENT

Figure 1:
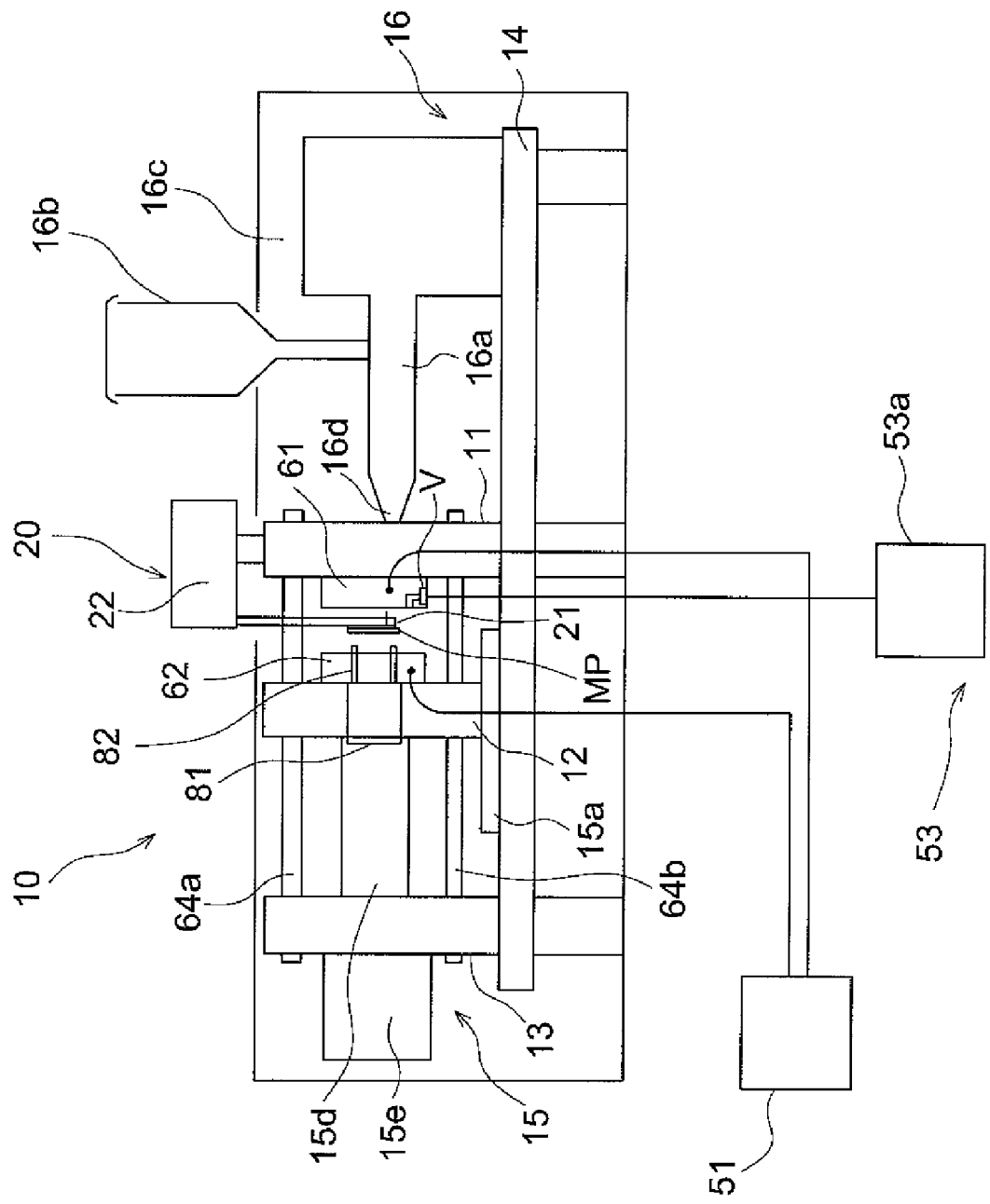
FIG. 1 is a front view showing a schematic structure of an injection molding device.

An injection molding device and a molding method, being embodiments of the present invention, will now be detailed while referring to the drawings. FIG. 1 is a front view showing a schematic structure of the injection molding device.

Injection molding device 100 of the present invention includes injection molding machine 10, take-out device 20, temperature control device 51, and pressure decreasing device 53. Injection molding machine 10 produces molded product MP by the injection, take-out device 20 is a section from which molded product MP is taken out, temperature control device 51 controls the temperature of molding tools 61 and 62 of injection molding machine 10, and pressure decreasing device 53 is a section to conduct vacuum drawing from the engaged molding tools. The molding tools are opened or closed horizontally in injection molding device 100.

Injection molding machine 10 includes fixed plate 11, movable plate 12, tool clamping device 13, molding tool open-close clamping device 15 and injection device 16. Injection molding machine 10 sandwiches fixed molding tool 61, being a first molding tool, and movable molding tool 62, being a second molding tool, between fixed molding plate 11 and movable molding plate 12, whereby both molding tools 61 and 62 are clamped to conduct the molding operation.

Fixed plate 11 is mounted on the center of supporting frame 14, so that fixed plate 11 supports take-out device 20 thereon. The inner side of fixed plate 11 detachably supports fixed molding tool 61, said inner side faces the inner side of movable plate 12. Fixed plate 11 is secured on tool clamping plate 13 via tie bars 64a and 64b, whereby fixed plate 11 can tolerate the pressure during the clamping operation (being a so called lock-up operation).

Upper tie bar 64a and lower tie bar 64b are provided between fixed plate 11 and tool clamping plate 13. Two upper tie bars 64a and two lower tie bars 64b are supported at four corners of fixed plate 11 and tool clamping plate 13, being aligned parallel each other. Through-holes are provided on the four corners of movable plate 12, so that tie bars 64a and 64b pass through said through-holes, whereby movable plate 12 can slide on tie bars 64a and 64b.

Movable plate 12 is supported by slide guide 15a, which will be detailed later, to move back and forth against fixed plate 11. The inner side of movable plate 12 detachably supports movable molding tool 62, and faces the inner side of fixed plate 11. Ejector 81 is mounted on movable plate 12. For the separation work of the molded product, ejector 81 works to push molded product MP, remaining in movable molding tool 62, from movable molding tool 62, whereby take-out device 20 can deliver it.

Tool clamping plate 13 is secured on the end of supporting frame 14. Movable plate 12 can be moved in the direction, being parallel to tie bars 64a and 64b, so that the distance between fixed plate 11 and movable plate 12 can be adjusted. For the clamping operation, tool clamping plate 13 supports movable plate 12 from its back through power driver section 15d of open-close clamping device 15.

Open-close clamping device 15 includes slide guide 15a, power driver section 15d, and actuator 15e. Slide guide 15a is mounted on supporting frame 14, and is just below movable plate 12, so that open-close clamping device 15 can support movable plate 12, and makes movable plate 12 to smoothly reciprocate against fixed plate 11 in the moving direction. Power driver section 15d is structured of a toggle link, to conduct the telescopic motion, by the driving power given by actuator 15e. Due to this motion, movable plate 12 comes near or separates from tool clamping plate 13, so that movable plate 12 can come into contact with fixed plate 11 to clamp to each other.

By above detailed open-close clamping device 15, fixed molding tool 61 and movable molding tool 62, both sandwiched between fixed plate 11 and movable plate 12, can be engaged, or when fixed plate 11 and movable plate 12 are separated, molding tool 61 and movable molding tool 62 can be separated to open. Further, for the engaging operation of both tools, movable plate 12 can be pushed to fixed plate 11 by a large force generated by actuator 15e, so that fixed molding tool 61 and movable molding tool 62 can be engaged with each other by the sufficient force.

Injection device 16, structured of cylinder 16a, raw material storing section 16b, and screw driving section 16c, can eject thermally controlled liquid resins from injection nozzle 16d. On injection device 16, since injection nozzle 16d of cylinder 16a is detachably connected to a gate (which will be detailed later) provided on fixed plate 11, the melted resin can be supplied to cavity CV (see FIG. 2) at a predetermined time, wherein cavity CV is formed of fixed molding tool 61 and movable molding tool 62, both in the engaged condition.

Take-out device 20 is structured of grabber 21 to take out molded product MP, and three dimension drive device 22 to move grabber 21 in three-dimensional area. When fixed molding tool 61 and movable molding tool 62 are separated to be open, take-out device 20 serves to take molded product MP, remaining in fixed molding tool 61 or movable molding tool 62, and to convey it to the outside. In a case that molded product MP is the optical element, grabber 21 is configured to catch an unnecessary spur portion, which is produced to be attached at the molded product MP, so that the molded product having the optical surface cannot be damaged.

Temperature control device 51 is configured to control the temperature of fixed molding tool 61 and movable molding tool 62. In detail, since medium solution to control the temperature is introduced into liquid circulating channels, provided on fixed molding tool 61 and movable molding tool 62, wherein fixed molding tool 61 and movable molding tool 62 are heated to a desired temperature, a transparent resin, injected into cavity CV, provided within fixed molding tool 61 and movable molding tool 62, is allowed to be hardened.

Pressure decreasing device 53 includes vacuum pump 53a which draws a vacuum from cavity CV formed of fixed molding tool 61 and movable molding tool 62, and valve V, which opens or closes an exhausting path of vacuum pump 53a. Vacuum pump 53a is connected with hole 52 which will be detailed later (see FIG. 2), provided on fixed molding tool 61, through valve V. The air is drawn from cavity CV through said hole 52.

Figure 2C:
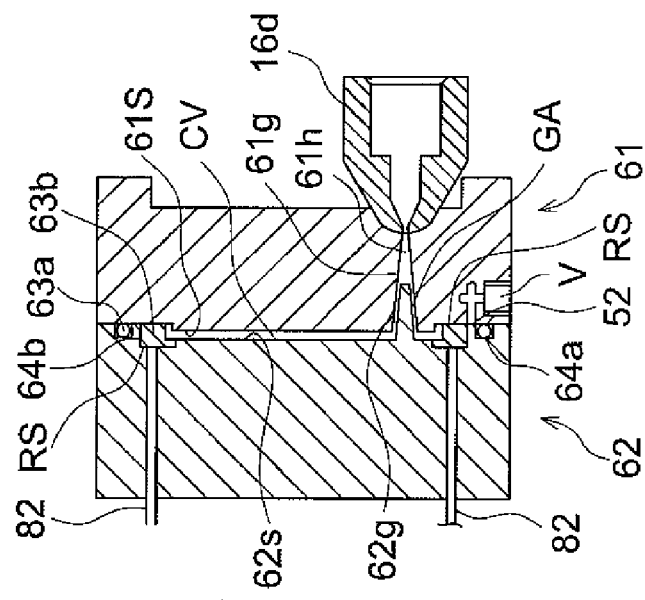
FIG. 2C shows peripheries of the fixed molding tool and the movable molding tool.
Figure 2B:
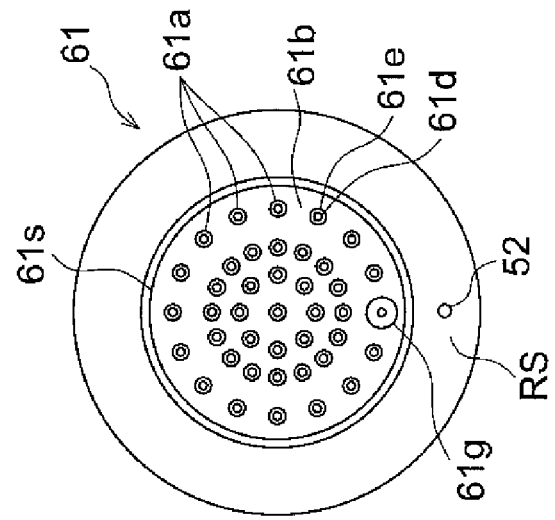
FIG. 2B shows an inside of a fixed molding tool of the paired molding tools.
Figure 2A:
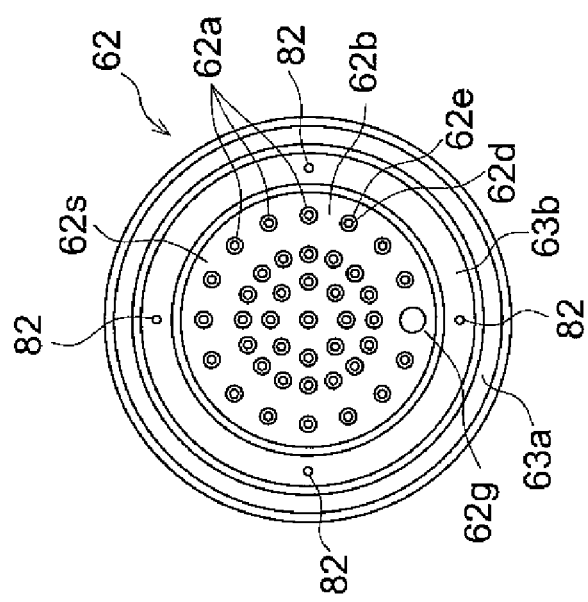
FIG. 2A shows an inside of a movable molding tool of paired molding tools.

The molding tools relating to Embodiment 1 of the present invention will now be detailed referring to the drawings. FIG. 2A shows an inside of movable molding tool 62 of the paired molding tools, FIG. 2B shows an inside of fixed molding tool 61 of the paired molding tools, and FIG. 2C shows peripheries of fixed molding tool 61 and movable molding tool 62. In FIG. 2C, a pattern of the molded product is not shown.

Fixed molding tool 61 and movable molding tool 62 are engaged to be clamped, cavity CV is formed between both molding tools 61 and 62. After the energy curable resins, such as a thermosetting resin and an ultraviolet curable resin, are filled into cavity CV, heat processing, ultraviolet processing, and cooling process are conducted so that a molded product can be produced. As the thermosetting resins, listed are silicon resin, allyl ester, acrylic series resin, epoxy resin, polyimide, and urethane series resin. Further, as the ultraviolet curable resins, listed are silicon resin, acrylic series resin, epoxy resin, polyimide, and urethane series resin.

As shown in FIG. 2B, fixed molding tool 61 is formed to be cylindrical, which includes a plurality of element transferring sections 61a, arranged in two dimensions, and supporting body transfer section 61b to connect each section 61a, on the inner side of tool surface 61s. Each element transfer section 61a corresponds to a lens to serve as an optical element, being a circular periphery, which includes inner circular optical transfer section 61d, and outer peripheral border transfer surface 61e.

Fixed molding tool 61 further includes hole 52 to draw out the air. Spur portion 61g is formed at the lower section of fixed molding tool 61, through which the resin is introduced to cavity CV. Gate GA, serving as an entrance to introduce the resin, is provided on the end portion of spur portion 61g, being closest to cavity CV. Gate GA is provided below a portion to meet the center of molded product MP.

As shown in FIG. 2A, movable molding tool 62 is cylindrical, including a plurality of element transfer sections 62a, being two-dimensionally arranged, and supporting body transfer section 62b to connect each section 62a, on the inner side of tool surface 62s. Each element transfer section 62a is configured to meet each element transfer section 61a of fixed molding tool 61, so that each element transfer section 62a has a circular periphery, which includes inner circular optical transfer section 62d, and outer peripheral border transfer surface 62e.

When fixed molding tool 61 and movable molding tool 62 are clamped to generate cavity CV, a portion to correspond the optical element to be produced is formed by element transfer sections 61a and 62a.

Further, movable molding tool 62 includes O-ring 63a, being a first sealing member, on the outside of tool surface 62s. Said O-ring 53a, being circular, is set in circular groove 64a, provided on movable molding tool 62. O-ring 63a is formed of a member not to generate a gas, and functions to be airtight in cavity CV. O-ring 63a is, for example, formed of a fluorine resin.

Still further, movable molding tool 62 includes resin seal 63b, serving as a second sealing member, between tool surface 62s and O-ring 63a. A circular resin seal is set in circular groove 64b, provided on movable molding tool 62. Resin seal 63b has a characteristic not to be affected by an energy curable resin to form a seal. For example, listed are silicon resin, fluorine resin, polyimide, polyamide-imide, 66 nylon, and perfluorooelastomer.

Still further, on movable molding tool 62, a plurality of ejector pins 82 are provided on a portions meeting resin seal 63b. These ejector pins 82 are connected to ejector 81, shown in FIG. 1. Ejector pins 82 are perpendicularly through-holed into round surface RS, being outside of tool surface 62s of movable molding tool 62, so that ejector pins 62 are movable.

FIG. 3 shows the boundary of fixed molding tool 61 and movable molding tool 62, to detail an operation of the molding tools. FIG. 3A shows a first clamping position, FIG. 3B shows a second clamping position, and FIG. 3C shows a third clamping position.

As shown in FIG. 3A, the first clamping operation is conducted by injection molding machine 10 shown in FIG. 1, whereby the contacting portion between O-ring 63a and fixed molding tool 61 becomes tightly adhered. That is, in the condition of the first clamping position, the inside of cavity CV becomes airtight. In this condition, after injection nozzle 16d of injection device 16 in FIG. 1 is driven to come into air-tight contact with resin supplying hole 61h of fixed molding tool 61, valve V is controlled to open. By vacuum pump 53a, the air in cavity CV is vacuumed through hole 52, so that the air pressure in cavity CV is decreased. During said air vacuuming operation, distance "a" between a mating surface of fixed molding tool 61 and a mating surface of movable molding tool 62 is 0.8 mm, for example.

As shown in FIG. 3B, after the air vacuuming operation, the second clamping operation is conducted by injection molding machine 10, so that the contacting portion between resin seal 63b and round surface RS of fixed molding tool 61 becomes tight contact. That is, under the condition of the second clamping position, cavity CV becomes a hermetically-closed condition. After that, the thermosetting resin, being the energy curable resin, is ejected into cavity CV from injection device 16. During said ejecting operation, distance "b" between the mating surface of fixed molding tool 61 and the mating surface of movable molding tool 62 is 0.1 mm, for example.

As shown in FIG. 3C, after the thermosetting resin is filled in cavity CV, and before the thermosetting resin has been hardened, the third clamping operation is conducted by injection molding machine 10, the mating surface of fixed molding tool 61 and the mating surface of movable molding tool 62 become a perfect and tight contact. That is, under the condition of the third clamping position, the compression molding operation is conducted.

After the thermosetting resin has been hardened, the molding tools are opened, the spur portion is then held by grabber 21, and resin seal 63b is pushed out by ejector pin 82, subsequently, molded product MP is taken out from movable molding tool 62.

Figure 4A:
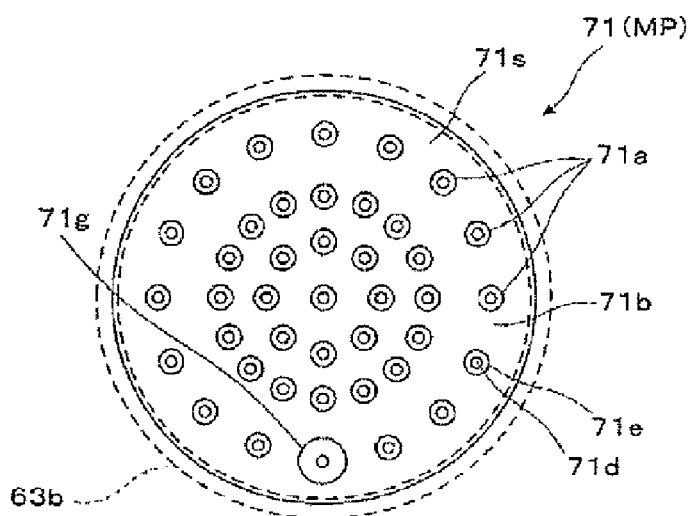
FIG. 4A is a top view of a molded product.
Figure 4B:
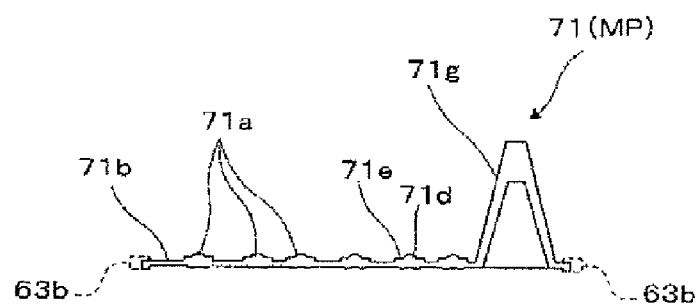
FIG. 4B is a side view of the molded product.
Figure 4C:
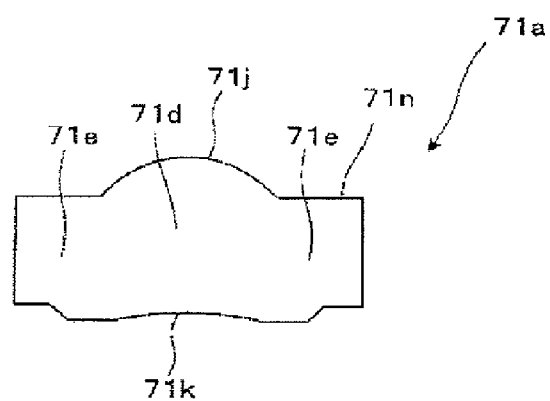
FIG. 4C is a side view of an optical element which is separated from the molded product.

FIG. 4 details molded product MP, being an optical element array, which is molded by injection molding device 100 of FIG. 1. FIG. 4A is a top view of optical element array 71, FIG. 4B is a side view of optical element array 71, and FIG. 4C is a side view of an optical element, being a single item, which has been separated from optical element array 71.

The outer shape of optical element array 71, shown in FIGS. 4A and 43, is a circular disk, which includes a plurality of optical elements 71a, being two-dimensionally arranged, and supporting body 71b, connecting each optical element 71a. Optical element 71a segment corresponds to element transfer sections 61a and 62a, provided on molding tools 61 and 62 of FIGS. 2B and 2A, while supporting body 71b corresponds to supporting body transfer sections 61b and 62b, provided on molding tools 61 and 62. Optical element 71a, being the former, includes optical element body 71d, formed by being sandwiched between optical transfer surfaces 61d and 62d of molding tools 61 and 62, and flange section 71e, formed by being sandwiched between peripheral border transfer surfaces 61e and 62e of molding tools 61 and 62.

Concerning the optical element, namely a lens, shown in FIG. 4C, the upper surface of optical element body 71d is formed of first optical surface 71j, while the lower surface of optical element body 71d is formed of second optical surface 71k, whereby a lens is formed of both surfaces 71j and 71k. Spur portion 71g, being shaped to be a triangular pyramid, is formed at the end of optical element array 71.

In above detailed injection molding device 100, while the injecting operation is conducted, the resin tends to be filled into an area, existing higher than gate GA at the top of spur portion 61g, whereby distortion is not generated under gate GA of optical element array 71. Further, while the injecting operation is conducted, the resin is ejected through gate GA into the resin already accumulated in cavity CV, so that the air cannot be trapped in the resin, whereby oxygen does not disturb the resin to be hardened, that is, the resin is hardened in a short time. Due to this advantage, molded product MP can be evenly hardened, so that the optical elements can be molded very accurately, and antireflection coat can be evenly adhered onto optical element array 71.

Still further, by the above vacuum molding operation, the resin tends to unidirectionally spread in cavity CV, so that no distortion occurs above gate GA, whereby molded product MP can be produced without including distortion. Still further, since element transfer sections 61a and 62a are provided on the various positions, other than the position under gate GA, in which distortion may locally occur, no distortion occurs on optical element array 71, so that an accurate optical element 71a can be produced. As detailed above, since distortion of optical element array 71, that is, the distortion of total molded product MP, can be prevented, so that each of optical element 71a is formed very accurately.

Figure 5:
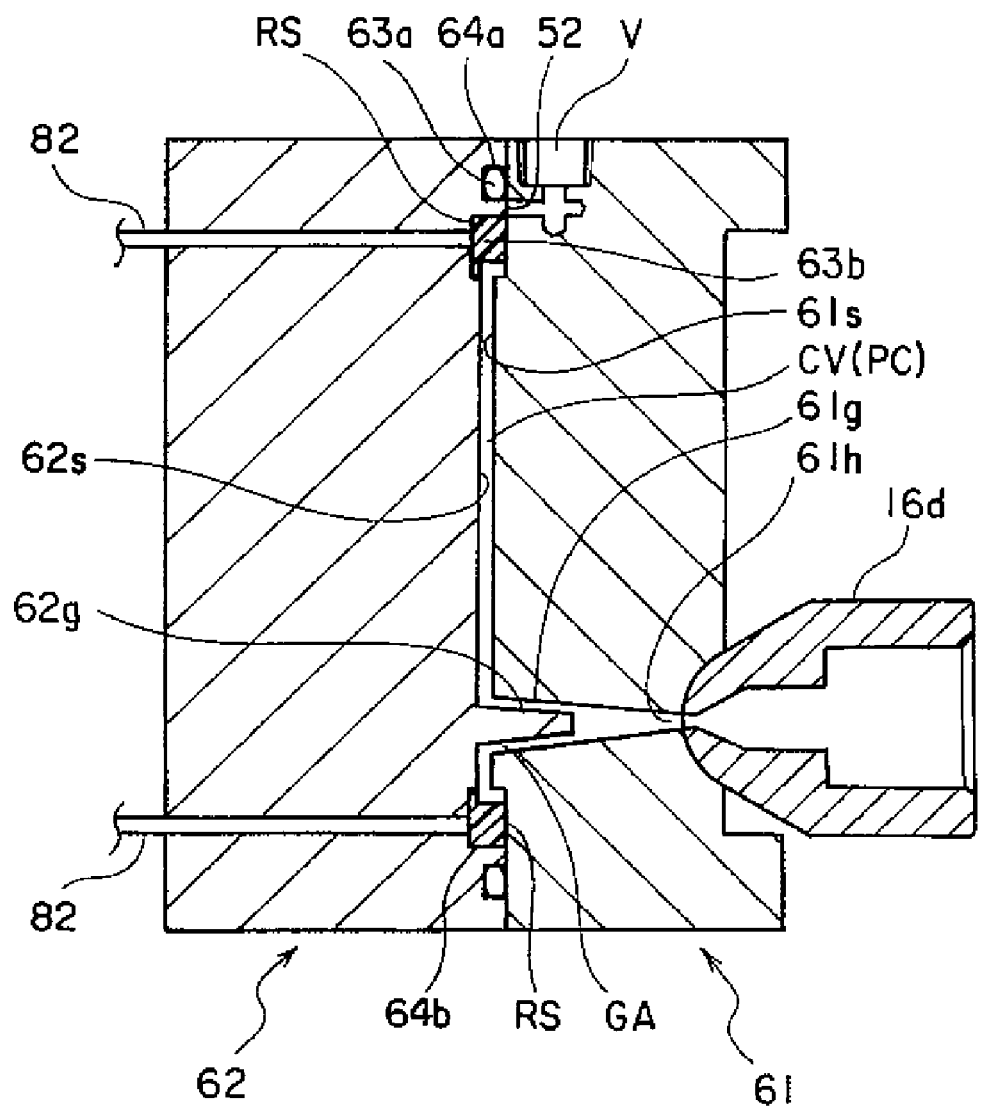
FIG. 5 shows another example of the peripheries of the fixed molding tool and the movable molding tool, shown in FIG. 2C.

FIG. 5 shows another example of molding tools 61 and 62, shown in FIG. 2. Hole 52 for drawing a vacuum is provided on the top surface of molding tool 61, whereby even if the resin leaks, hole 52 is prevented from stopping up.

Further, the operation of the molding tools, detailed in FIG. 3, may be changed as below.

FIG. 6 shows another example of the operation of the molding tools, wherein the border between fixed molding tool 61 and movable molding tool 62 is detailed. FIG. 6A shows the first clamping position, and FIG. 6B shows the second clamping position.

As shown in FIG. 6A, the first clamping operation is conducted by injection molding machine 10, whereby the contacting portion of O-ring 63a and fixed molding tool 61 become tightly engaged. That is, in the condition of the first clamping position, the inside of cavity CV becomes an air-tight condition. In this condition, after injection nozzle 16d is driven to come into air-tight contact with fixed molding tool 61, valve V is controlled to open. By vacuum pump 71, the air in cavity CV is vacuumed through hole 52, so that distance "a" between fixed molding tool 61 and movable molding tool 62 is 0.8 mm, for example.

As shown in FIG. 6B, after the air vacuuming operation, the second clamping operation is conducted by injection molding machine 10, so that the contacting portion between resin seal 63b and fixed molding tool 61 becomes a tight contact condition. Further, fixed molding tool 61 and movable molding tool 62 become completely-tight condition. That is, under the condition of the second clamping position, cavity CV becomes hermetically-closed. After that, the thermosetting resin, being the energy curable resin, is supplied into cavity CV.

The present invention has been detailed, based on the embodiments, however, the present invention is not limited to the above detailed embodiments, and various methods will be used. For example, in the above cases, the thermosetting resin is used as the energy curable resin, and molding tools 61 and 62 are heated to cure the thermosetting resin. However, when the ultraviolet curable resin is used, the ultraviolet rays are radiated during the molding operation, that is, based on the characteristics of the resin, various hardening operations can be used. Specifically, when the ultraviolet curable resin is to be used for the injection molding operation, movable molding tool 62 may be a transparent member, so that the ultraviolet rays can enter cavity CV.

Still further, in the above embodiments, gate GA can be positioned at the center, or any preferable position, instead of being positioned lower than the center of the molded product.

The invention claimed is:

1. A molding device for molding a product, the molding device comprising:
   a first molding tool;
   a second molding tool which is movable against the first molding tool;
   a first sealing member which is provided between the first molding tool and the second molding tool, wherein said first sealing member is configured to secure air tightness of the molding device;
   a second sealing member which is provided between the first molding tool and the second molding tool, wherein said second sealing member is configured to prevent a resin from leaking:
   an ejector pin to eject the second sealing member with the product; and
   an ejecting device to eject the ejector pin.

2. The molding device of claim 1, wherein the first sealing member is arranged to be outer than the second sealing member from a position of a cavity which is to be formed when the first and second molding tools are engaged.

3. The molding device of claim 1, wherein a vacuuming through-hole is further provided between the first sealing member and the second sealing member of the first molding tool.

4. The molding device of claim 1, wherein the first sealing member and the second sealing member are mounted on the second molding tool.

5. The molding device of claim 1, wherein the first sealing member comprises an O-ring.

6. The molding device of claim 1, wherein the second sealing member is formed of a resin.

7. An injection molding device comprising the molding device of claim 1.

8. A molding method using the molding device of claim 1, the method comprising:
   drawing air from engaged first and second molding tools at a first clamping position where the first molding tool and the second molding tool are closed to engage to each other through the first sealing member;
   injecting a material at a second clamping position where the first molding tool and the second molding tool are positioned to be closer to each other than at the first clamping position; and
   hardening the injected material at the second clamping position.

9. The method of claim 8, further comprising ejecting the hardened material from the molding device by pushing the second sealing member with an ejector pin.

10. A method for molding an article using the molding device of claim 1, the method comprising:
    drawing air from engaged first and second molding tools at a first clamping position where the first molding tool and the second molding tool are closed to engage to each other through the first sealing member;
    injecting a material at a second clamping position where the first molding tool and the second molding tool are positioned to be closer to each other than at the first clamping position; and
    hardening the injected material at a third clamping position, where the first molding tool and the second molding tool are positioned closer to each other than at the second clamping position.

11. The method of claim 10, wherein ejecting the hardened material from the molding device by pushing the second sealing member with an ejector pin.

12. A method for molding an article using the molding device of claim 1, the method comprising:
    drawing air from engaged first and second molding tools at a first position where the first molding tool and the second molding tool are closed to engage to each other through the first sealing member;
    injecting a material at a second clamping position where the first molding tool and the second molding tool are positioned to be closer to each other than at the first clamping position and the first and second molding tools contact each other; and
    hardening the injected material at the second clamping position.

13. A molding device for molding a product, the molding device comprising:
    a first molding tool;
    a second molding tool which is movably supported by a supporting member against the first molding tool;
    a first sealing member which is provided between the first molding tool and the second molding tool;
    a second sealing member which is provided between the first molding tool and the second molding tool, wherein said first sealing member is arranged to be outer than the second sealing member from a position of a cavity which is to be formed when the first and second molding tools are engaged; and
    an ejector pin for ejecting the product by pushing the second sealing member.

14. The molding device of claim 13, wherein a vacuuming through-hole is further provided between the first sealing member and the second sealing member of the first molding tool.

15. The molding device of claim 13, wherein the cavity has a plurality of element transferring sections.

16. The molding device of claim 13, wherein the cavity has a plurality of element transferring sections for producing a plurality of optical elements as the product.

* * * * *